United States Patent [19]
Kriz et al.

[11] 3,985,911
[45] Oct. 12, 1976

[54] PASTRY SHORTENING

[75] Inventors: Edward F. Kriz, Berwyn, Ill.; Antal G. Oszlanyi, North Olmsted, Ohio

[73] Assignee: SCM Corporation, Cleveland, Ohio

[22] Filed: Feb. 4, 1974

[21] Appl. No.: 439,367

Related U.S. Application Data

[63] Continuation-in-part of Ser. No. 206,951, Dec. 10, 1971, abandoned.

[52] U.S. Cl. .............................. 426/602; 426/417; 426/607
[51] Int. Cl.² .......................................... A23D 5/02
[58] Field of Search ........... 426/336, 339, 362, 417, 426/519, 524, 606, 607, 602

[56] References Cited
UNITED STATES PATENTS

| | | | |
|---|---|---|---|
| 2,972,541 | 2/1961 | Cochran et al. | 426/173 |
| 3,255,016 | 6/1966 | Parker | 426/62 |
| 3,455,700 | 7/1969 | McMichael et al. | 426/519 |

*Primary Examiner*—Frank W. Lutter
*Assistant Examiner*—N. Greenblum
*Attorney, Agent, or Firm*—Merton H. Douthitt; S. I. Khayat

[57] ABSTRACT

Disclosed is a method of preparing a beta-prime stable, tough, plastic and untempered pastry shortening which is functional for roll-in dough pastry applications over the temperature range of 50 to 90°F. The shortening can be hydrous or anhydrous and is compounded from vegetable fat and mixtures of vegetable fat and animal fats. The compounded shortening is heated to the molten state and rapidly chilled with agitation as in a Votator A heat exchanger to a temperature of 62° to 80° F. and further chilled and kneaded as in Votator C heat exchanger at a temperature of 60° to 75° F. to form a plastic shortening mass which is extruded into desired form.

5 Claims, No Drawings

PASTRY SHORTENING

CROSS REFERENCE TO RELATED APPLICATIONS

The present application is a continuation-in-part to our co-pending application Ser. No. 206,951 filed Dec. 10, 1971, now abandoned.

BACKGROUND OF THE INVENTION

A. Field of the Invention

This invention relates to an improvement in the manufacture of roll-in pastry shortening and more particularly to an improvement in the production of the pastry shortening used in making roll-in pastry dough products such as puff pastry and danish pastry.

B. Description of the Prior Art

Roll-in pastries, such as puff pastry (sometimes referred to as French pastry) and danish pastry, are made from a laminated dough sheet consisting of a great many very thin alternate layers of shortening and dough.

Puff pastry and danish pastry are discussed in Bakery Technology and Engineering, S. A. Matz, Editor (1960), at pages 304 to 306 and pages 258 to 259, respectively. The preparations of puff pastry and danish pastry have been similar insofar as layers of fat are interleaved between layers of dough, so that upon baking a separation of dough strata occurs. Puff pastry ingredients usually include no leavening, but, in spite of this, puff pastry baked products have an open network of crisp and flaky layers. In danish pastry, however, yeast leavening and auxiliary ingredients produce a baked product having a soft and porous structure in the dough layers.

In a conventional method of making danish-type pastry goods, a yeast leavened dough is rolled into an approximately square sheet, and beginning at one end of the sheet a layer of fats is spread on approximately two-thirds of the sheet surface. The untreated third is then folded over the middle treated portion, and the remaining one-third which has been covered with fat is folded on top of the untreated surface. The folded dough is then rolled again to produce a sheet consisting of three layers of dough separated by two layers of fat. The dough is then sheeted again and folded as before, and the folding steps are continued for a number of times. The final laminated sheet is then shaped into coffee cakes, rolls and the like.

Puff pastry has been conventionally made in a manner similar to danish pastry, except, as mentioned above, the puff pastry is not usually leavened. In a so-called rapid puff pastry method a dough ball is formed from ingredients including fat, flour, salt and water; and then a large quantity of roll-in fat is "blitzed" into the dough ball. In the "blitz" method the fat is not spread on the dough. Further background on the nature of puff pastry products can be found in the article entitled, "Treatise on Puff Pastry", bulletin Rm-172 dated Oct. 20, 1968, published by The Associated Retail Bakers of America, 735 West Sheridan Road, Chicago, Illinois, and the publication entitled, "Sweet Doughs & Pastry", published by The American Institute of Baking, Chicago, Illinois, in 1968 (3rd. Revision).

The rheological characteristics of the shortening used in the preparation of puff pastry is quite critical because the desired puff pastry product is a treated flaky base product with definite separation of the dough layers. The puff pastry itself contains flour, shortening, salt and water. Shortening is used in the dough itself and as a roll-in additive between the layers of dough. The preparation of the puff pastry itself involves three basic steps: preparation of the dough, incorporation of the roll-in fat and the folding and sheeting operation. The dough preparation and folding and sheeting steps develop the gluten in the flour.

These procedures are designed to optimize the gluten development for maximum expansion upon baking. During the folding and sheeting operations which are usually conducted at room temperature, the puff pastry shortening must be plastic and tough so as to spread into a thin, uniform film between the layers of dough without either soaking into the dough or tearing the dough. Furthermore, the finished puff pastry product must have good "mouth feel"; so the shortening should have a rather sharp melting characteristic in the vicinity of body temperature.

Puff pastry shortening must be capable of being spread into uniform layers when compressed between layers of dough. This requirement means that the dough should have certain toughness or elastic stress-strain characteristics within the normal room temperatures encountered. Storage of pastry shortening may be in the range of 50° to 90° F. while the temperature of actual use is about 70° to 75° F. If the pastry shortening is too firm or too hard when used, it will tear holes in the dough and cause discontinuities when the dough is folded. If the shortening is too soft, the shortening has a tendency to "oil out" or soak into the dough rather than remaining as a distinct layer between the two layers of dough. Since shortening is used directly from storage, the shortening should have a wide temperature range of usefulness.

In other words, the shortening should possess ideally the unique combination of properties wherein it is tough yet plastic over a wide temperature range of 50° to 90° F. while maintaining its structure and consistency when worked repeatedly and produce a light flaky pastry upon baking. In the baking arts, this is referred to as a "functionality"; so the shortening should be "functional" over the temperature range of 50° to 90° F. Furthermore, the shortening should have a low enough melting point to provide a good mouth feel to the finished baked product rather than the waxiness or greasy mouth feel associated with the high-melting fats.

In the past, pastry shortenings have been functional over very narrow ranges of temperatures. In fact, it is not an uncommon requirement that the shortenings be brought to a specific temperature (say 70° to 75° F.) before rolling into the dough. This means that the pastry shortening must be brought to the use temperature when the temperature of storage is different from the temperature of use. The achievement of even these rather narrow temperature ranges of functionality has been only after tempering the finished shortening for several hours or even several days to achieve the crystalline structure necessary for shortening functionality.

Accordingly, the present invention provides a continuous process for forming an untempered functional pastry shortening having functionality for roll-in pastry applications over a temperature range of 50° to 90° F. while providing good mouth feel in the finished baked product. As used herein the term "untempered" means that the pastry shortening is not subjected to a prolonged additional thermal treatment to develop and stabilize the crystalline phases after the shortening is "filled" or extruded into user packages.

SUMMARY OF THE INVENTION

In attaining the objects of this invention, one feature resides in compounding a beta-prime, stable shortening from vegetable fats and mixtures of vegetable fats and animal fats to form a shortening having a Wiley Melting Point in the range of about 110° to 120° F. and an SFI profile within the range of:

| Temperature °F. | SFI |
| --- | --- |
| 50° | 28 to 40 |
| 70° | 24 to 37 |
| 80° | 22 to 34 |
| 92° | 16 to 28 |
| 100° | 13 to 22 |
| 110° | 5 to 16 | maintaining said shortening in the molten and liquid state, i.e., at a temperature, usually not in excess of 20° F. above the temperature at which the molten shortening has substantially no solid particles (SFI is zero or near zero), continuously feeding the liquid shortening to one end of an elongated scraped wall, heat exchange zone wherein the shortening is rapidly chilled with vigorous agitation to a temperature $T_1$ within the range of about 62° to 80° F. and preferably 65° to 72° F. to nucleate and develop beta-prime crystal nuclei in said shortening and then, simultaneously kneading and removing heat from the resulting nucleated shortening in a kneading and heat exchange zone at a temperature $T_2$ in the range of 75° to 60° F. for a time sufficient to further develop beta-prime crystalline phases with concomitant thickening while maintaining an extrudable plastic shortening mass and extruding the mass at a temperature of about 62° to 77° F. to form a tough, plastic, flexible, untempered pastry shortening which is functional over the temperature range of 50° to 90° F. for pastry preparation. In this process, the higher $T_1$ temperature will require lower $T_2$ temperatures to achieve the desired shortening consistency and beta-prime crystalline stability.

The extrudable shortening mass can be extruded or "filled" directly into user packages in the form of blocks, sheets or other desired shape and is ready for immediate use. The packaged or "filled" shortening should be stored or warehoused at temperatures below 110° F. and preferably below about 85° to 90° F. to prevent degradation of the crystalline structure.

Formerly the solidification of the pastry shortening from the liquid state was accomplished by spraying the liquid shortening into a trough or vat of water maintained at a relatively low temperature. This method has a number of important disadvantages in that it resulted in non-uniform crystal development which detracted from shortening functionality even after prolonged periods of tempering. Subsequently, a method was developed and widely adopted wherein the shortening is solidified by contact with the exterior surface of an internally cooled rotating drum or chill roll. Such a method is described in U.S. Pat. No. 2,442,537.

More recently, the trend has been to utilize a closed heat exchanger apparatus, such as that generally known as the "Votator A" unit, in the solidification of the shortening. This apparatus comprises one or more thin-walled metal tubes surrounded by a cooling medium such as evaporating liquid ammonia and provided with rapidly rotating internal blades. The shortening passing through the apparatus is supercooled and maintained in a liquid condition by the agitation of the blades. Upon leaving the chilling apparatus, the supercooled shortening may be subjected to screening, solidification and printing, and tempering. Such processes are described in U.S. Pat. No. 2,772,976 and British Pat. Nos. 869,614 and 1,049,368.

None of the prior art techniques achieves the unique and specific shortening functionality achieved by the present invention.

The term "fat" as used herein and as understood in the art, includes rendered animal fats (including marine animals) or oil or stearine derived therefrom, any or all of which can be hydrogenated and any combination of such ingredients. As used herein, the term "plastic" shortening defines a solid, non-fluid and non-pourable shortening workable at room temperature.

It is well known in the art that certain kinds of fat crystals, most notably the beta-prime crystals, have the capacity to form a rigidly interlocking structure when suspended in a liquid component if the solids are present in sufficient amounts.

As used herein, the term "beta-prime-phase-tending" defines an overall tendency of certain triglyceride solids to crystallize in the beta-prime phase. This does not mean, however, that under proper conditions triglyceride solids cannot be transformed from a beta-prime-phase to a beta phase. The types of polymorphic crystalline structures of fats can be identified by their X-ray diffraction patterns and are described in U.S. Pat. Nos. 2,521,242 and 2,521,243.

DETAILED DESCRIPTION OF THE INVENTION

The pastry shortenings of the present invention are preferably compounded from three beta-prime glyceride stocks as follows:

| Base Stock | Iodine Value | Wiley Melting Point °F. | Weight Percent of Shortening Composition |
| --- | --- | --- | --- |
| Soft Stock | 50 to 110 | 70 to 110 | 60 to 96 |
| Intermediate Stock | 35 to 49 | 111 to 125 | 0 to 35 |
| Hard Stock | 0 to 20 | 126 to 150 | 2 to 10 |

Suitable base stocks of these three types can be derived from vegetable fats and mixtures of animal and vegetable fats including triglyceride oils and fats such as cottonseed oil, soybean oil, peanut oil, olive oil, palm oil, corn oil, rapeseed oil, sunflower seed oil, sesame oil, safflower oil, sardine oil, lard, rearranged lard, tallow or lard and the like which are hydrogenated or rearranged to meet the Iodine Value and W. M. P. requirements. These base stocks are glycerides containing in the glyceride molecule saturated and unsaturated long chain acyl radicals having from about 12 to 24 carbon atoms such as lauroyl, lauroleoyl, myristoyl, myristoleoyl, palmitoyl, palmitoleoyl, stearoyl, oleoyl, linoleoyl, linolenoyl, elaidoyl, arachidoyl, gadoleoyl, arachidonoyl, benhenoyl, erucoyl, brassidoyl, clupadonoyl, lignoceroyl and/or selacholeoyl. Suitable base stock also can be derived from randomly and low temperature interesterified fatty triglycerides containing oils and fats such as interesterified cottonseed oil and lard. Suitable base stocks are shown in U.S. Pat. No. 2,972,541 (e.g., the strating oil described in Column 4 and the various solvent crystallized fractions derived therefrom).

It is known that animal fats have a tendency to produce a somewhat "greasy" mouth feel in the finished pastry product, and therefore it is often preferred to use fats which are derived substantially entirely from vegetable sources.

Suitable partial hydrogenation of liquid soybean and/or cottonseed oil to form the preferred base stock of this invention can be carried out by conventional methods and usually consist of a batch process whereby the oil is contacted with hydrogen in the presence of a nickel catalyst.

The Iodine Value (I. V.) is defined as the number of grams of iodine absorbed by a 100-gram sample of the oil or fat. Of course, the extent of iodine adsorption is related proportionally to the degree of the oil or fat's unsaturation.

Traditionally bakers have always thought that for a pastry shortening to be functional, it must include water; but recently developed anhydrous shortening is just as functional and even performs better than many hydrous roll-in type shortenings. The presence or absence of water in the pastry shortening of the invention is a matter of choice, and the pastry shortening can contain 0 to about 15 parts (and usually about 1 to 10 parts) by weight water per 100 parts of shortening without detracting from functionality. When water is employed, an emulsifier such as mono- and/or diglycerides is usually employed to maintain a dispersion between the aqueous and organic phases.

In the method of invention, a liquid mixture of the same stocks with or without up to 4% by weight of an edible emulsifier such as a partial glyceride emulsifier (that is, monoglycerides and diglycerides or mixtures of mono- and diglycerides with or without small proportions of triglycerides) of 12 to 20 carbon atom fatty acids is held at an elevated temperature high enough to maintain the mixture completely liquid and is then (a) rapidly cooled with vigorous agitation as in a Votator A unit to a temperature at which crystal beta-prime nuclei form, the cooling being controlled so that a temperature in the range of 62° to 80° F. is reached within a few minutes, preferably within 1 minute and the mixture is then kneaded and further chilled in "Votator" C unit at a temperature range of 75° to 60° F. to cause the glycerides to solidify on the crystal nuclei as beta-prime stable crystals.

A "Votator" C unit is generally similar in structure and design to a "Votator" A unit except for the drive shaft which is mounted eccentrically. This is why the C unit functions as a kneading and working unit in addition to its capacity to exchange heat. Further, and because of efficiency and economy the C unit is connected in series with the A unit which gives advantage to continuous operations. In fact, only a pipe of a few feet in length separates the two units. Thus, due to the connection in series and the close proximity of the two units residence time in the C unit is very much comparable to the residence time in the A unit. They are, or can be made, different only in specialized batch operations which demand additional working and kneading of the chilled fat.

In essence, the process depends on the degree and rate of cooling the liquid fats so that as the crystallization is completed, the ultimate particle size is such that good plasticity is obtained without the need of tempering.

The type of continuous cooling employed is preferably a relatively narrow elongated tube having an inlet adjacent one end and an outlet adjacent the other end and jacketed for a cooling medium. Agitation means such as rotating vanes or blades which closely approach the inner walls of the tube so as to produce maximum shearing effect are provided. One such type of apparatus for producing simultaneous agitation and cooling is the one referred to above as "Votator A" and is the type described in U.S. Pat. No. Re 21,406.

The inlet temperature of the mixture will depend to some extent upon the temperature at which the shortening is completely in the liquid phase without any discrete solid particles therein.

The intensity of the agitation and the amount of cooling produced by the cooling medium are coordinated with each other so that the desired objective of rapid super-cooling is achieved. However, in a continuous cooler, such as a Votator, residence times of material in the cooling zone of about 15 seconds to 2 minutes may be used effectively. Preferably the residence time and time for cooling the material to the temperature indicated should be not greater than 1 minute.

The factor which determines the desired outlet temperature of the material from the cooler as previously suggested is the production of small crystalline nuclei upon which the glycerides can crystallize. With this purpose in mind, the outlet temperature is maintained between about 62° to 80° F. Crystal development is brought about by passing the mixture immediately to a kneading and heat removal operation where the heat of crystallization (and sometimes sensible heat) is removed as in a Votator C unit disclosed in U.S. Pat. Nos. 3,568,463; 3,455,700 and particularly 3,385,354, the disclosures of which are incorporated herein by reference. The apparatus of U.S. Pat. No. 3,019,110 can also be adapted for this purpose. The shortening emerges from the Votator C unit fully functional and ready for immediate use after extruding or printing into the form of sheets, blocks, cubes or other user packages at temperatures in the range of 62° to 77° F. No tempering is required for pastry functionality. It is an important feature of the present invention that "Votator B" unit is required for shortening functionality. This is a significant departure from U.S. Pat. Nos. 3,568,463 and 3,455,700.

The technique is quite a departure from the art wherein tempering was carried out for several hours or even several days before pastry functionality was achieved.

In the following examples, all parts are parts by weight, all percentages are weight percentages and all temperatures are in ° F. unless otherwise indicated:

EXAMPLE 1

A mixture of 70% prime steam lard and 30% hydrogenated soybean oil which has been hydrogenated to an I. V. of 82 and a W. M. P. of 80° F. is rearranged by catalytic rearrangement.

The resulting bases fat has the following characteristics:

| | |
|---|---|
| Wiley Melting Point | 94° F. |
| Iodine Value | 71 |

-continued

| Temperature °F. | SFI |
|---|---|
| 50° | 23 |
| 70° | 12 |
| 80° | 9 |
| 92° | 4 |
| 100° | 1 |
| 110° | 0 |

EXAMPLE 2

Seventy-four and one-half parts of the bases fat of Example 1 and 20 parts of the solvent crystallized "GS$_3$ fraction" prepared in accordance with Example 6 of U.S. Pat. No. 2,972,541; 5 parts of hydrogenated tallow having a maximum I. V. of 5 and a capillary melting point of 140° to 145° F.; 0.5 parts of mono- and diglycerides from hydrogenated vegetable oil having a monoglyceride content of at least 40%; an I. V. of 70 to 80 and a capillary melting point of 110° to 120° F., are heated in a conventional mixing tank to a temperature of about 140° F. with agitation to yield a liquid shortening. The liquid shortening is passed through a scraped-wall heat exchanger of the type shown in U.S. Pat. Nos. Re 21,406 or 3,455,700 (a Votator A-type unit) in which the liquid shortening is rapidly chilled with agitation to a temperature in the range of about 65° to 72° F. in about ½ minute to nucleate the beta-prime crystals and form a plastic mass of shortening.

The chilled and worked plastic mass issuing from the Votator A unit is passed through a Votator C heat exchanger a kneading and working unit similar to the Votator A unit except that the drive shaft is mounted eccentrically and kneads the pastry shortening against the heat exchanger wall during cooling (see U.S. Pat. No. 3,385,354). The shortening issues from the Votator C unit at a temperature ranging from 68° to 60° F. (the outlet temperature of the C unit is near 68° F. when the outlet temperature of the A unit is near 65; and C unit outlet temperature near 60° F. when A unit outlet temperature is near 72° F.), is in the form of an extrudable plastic mass and is immediately extruded at a temperature of 70° to 75° F. through an extrusion device to form a continuous sheet of tough, plastic pastry shortening having a cross-section of ½ inch by 9 inches.

The shortening is fully functional as formed and has the following characteristics:

| Wiley Melting Point | 114° F. |
|---|---|
| Percent Alpha Monoglyceride Content | 0.8% |
| Iodine Value | 61 |
| Temperature °F. | SFI |
| 50° | 37 |
| 70° | 32 |
| 80° | 30 |
| 92° | 23 |
| 100° | 17 |
| 110° | 9 |

The shortening is tested as formed and without tempering according to the following test:

BAKING TEST TO DETERMINE EFFECTIVENESS OF PUFF PASTRY SHORTENING a. Mix 6 lbs. of bread flour, 1 lb. pastry shortening, 1 oz. salt and 3 lbs. 8 oz. water to form dough and develop gluten by mixing.

b. Cut dough into 2 lbs. 8 oz. portions and bench rest 10 minutes. Cover dough portions with plastic sheet during bench rest.

c. Pin each dough piece into a rectangular shape about ¼ in. thick.

d. Spot in 1 lb. 7 oz. pastry shortening over ⅔ of each dough surface.

e. Lap the uncovered portion of the dough over ½ of the area covered by the pastry fat and finish the three fold by lapping the remaining portion of the uncovered pastry shortening over the other two. With the rolling pin, shape the dough shortening piece into a square.

f. Flour the dough piece lightly and pass through Anets Sheeter Model MDR6SMB at settings 20 - 18 - 15. With rolling pin and very light pin pressure, shape corners into a square.

g. Dust off dough piece. Put a three fold on the dough (Fold No.1), as in Item (e) and pass through Anets Sheeter ant settings 20 - 18 - 15. When running each fold on the sheeter keep exposed dough seam away from operator. Brush flour off dough piece before each fold.

h. With the rolling pin and very light pin pressure, shape the corner into a square. Put on a three fold (Fold No. 2) and pass dough piece through sheeter at settings 20 - 18 - 15.

i. With the rolling pin and very light pressure, shape the corners into a square. Put on a three fold (Fold No. 3), cover dough with plastic and place in retarder for 30 minutes. Do not pass dough through sheeter after third fold.

j. After 30 minutes of retarding, pass dough through sheeter at 20 - 18 - 15. Place on a three fold (Fold No. 4), cover with plastic and retard an additional 30 minutes.

k. Remove dough retarder, divide piece in half with a bench scraper. Pass ½ through Anets Sheeter at 20 - 18 - 15 - 12 - 10 settings. Save other ½ for additional evaluation, if needed. Note: After passing dough through sheeter at Number 20 setting, turn dough piece 90 degrees before passing through at Number 18. Repeat turning procedure for 15 - 12 - 10 settings.

l. Cut six 3¼ inch diameter circle out of the dough to form patty shells (see Treatise of puff pastry cited above at page 135).

m. Cut and remove center circles of about 2 inches from the 3¼ inch diameter circles so as to form an annulus.

n. Record patty shell dough weight (weight should be 25 to 28 grams each).

o. Bake 15 minutes at 400° F.

p. Measure and calculate average height of baked patty shells in millimeters.

q. Calculate and record millimeters/grams.

Example: 56 millimeters (average height of 6 baked shells) 28 grams (average weight of 6 baked dough pieces) = 2.00 mm/g

TEST SPECIFICATIONS FOR ASSURING GOOD QUALITY PUFF PASTRY

| | |
|---|---|
| Average height of 6 patty shells | 1.8 mm/g minimum |
| Hard pellets of shortening | No hard pellets of shortening should be present in either the shortening or the combined shortening and dough piece. |
| Plasticity | Characteristics of butter |

The shortening produces patty shells having an average height of 2.2 mm/g and plasticity meeting the foregoing specifications when prepared from pastry shortening of the example having a temperature of 55° F., 65° F., 75° F. and 85° F. when used in the Baking Test procedure.

To further demonstrate the effectiveness of the present invention, the shortening of Example 2 is used in baking a conventional danish coffee cake and a conventional Pin Wheel type puff pastry according to the procedures given on page 14 and 26, respectively, of the "Sweet Dough and Pastry" publication of The American Institute of Baking described above. Light flaky pastry is obtained in each case.

EXAMPLE 3

A mixture of 52.3 parts of soybean oil which has been hydrogenated to an I. V. of 108 are mixed with 24.6 parts of the "GS$_3$ fraction" from Example 6 of U.S. Pat. No. 2,972,541 and 6.1 parts of non-random, non-lauric glyceride having W. M. P. of 110° F., an I. V. of 58, a transoleic content of 42% having a composition with the geometric figure in the drawing of U.S. Pat. No. 2,972,541, 4.4 parts of hydrogenated cottonseed oil having a maximum I. V. of 15 and a capillary melting point of 140° F.; 0.4 part of mono- and diglycerides from hydrogenated vegetable oil having a monoglyceride content of at least 40%; an I. V. of 70 to 80 and a capillary melting point of 110° to 120° F. and 10 parts of water; 2.2 parts of granulated salt are processed as in Example 2. The product is fully functional without tempering and has the following characteristics:

| | |
|---|---|
| Wiley Melting Point | 114° F |
| Iodine Value | 81 |
| Alpha Monoglyceride Content | 1.6% |
| Water Content | 9.5% |
| Salt Content | 2.2% |
| Temperature ° F. | SFI |
| 50° | 33 |
| 70° | 30 |
| 80° | 29 |
| 92° | 22 |
| 100° | 16 |
| 110° | 9 |

The shortening is tested as formed without tempering by the test described in Example 2 and baked goods prepared as in Example 2 and similar results are obtained.

EXAMPLE 4

A mixture of 65.4 parts of the base fat from Example 1; 17.5 parts of the "GS$_3$ fraction" from Example 6 of U.S. Pat. No. 2,972,541; 10 parts water; 4.4 parts of hydrogenated tallow having a maximum I. V. of 5; a W. M. P. of 142; 2.2 parts of salt and 0.5 parts of mono- and diglyceride of Examples 3 are processed as in Example 2.

The shortening has the following characteristics:

| | |
|---|---|
| Wiley Melting Point | 116° F. |
| Alpha Monoglyceride Content | 1.0% |
| Iodine Value | 61 |
| Salt Content | 2.2% |
| Water Content | 9.5% |
| Temperature ° F. | SFI |
| 50° | 37 |
| 70° | 32 |
| 80° | 30 |
| 92° | 23 |
| 110° | 17 |
| 110° | 9 |

The shortening is tested as formed without tempering and baked goods are prepared as in Example 2 and similar results are obtained.

EXAMPLE 5

A mixture of 60% tallow and 40% hydrogenated soybean oil which has been hydrogenated to I. V. of 82 and a W. M. P. of 80° F. are melted and blended together.

The resulting bases has the following characteristics:

| | |
|---|---|
| Wiley Melting Point | 99° F. |
| Iodine Value | 50 |
| Temperature ° F. | SFI |
| 50° | 25 |
| 70° | 15 |
| 80° | 13 |
| 92° | 8 |
| 100° | 4 |
| 110° | 0 |

EXAMPLE 6

84.5 parts of the base fat of Example 5 are mixed with 10 parts "GS$_3$ fraction" prepared in accordance with Example 6 of the U.S. Pat. No. 2,972,541; 5 parts of hydrogenated tallow having a maximum I. V. of 4 and a capillary melting point of 140° to 145° F. and 0.5 parts of mono- and diglyceride of Example 3 are processed as in Example 2.

The shortening has the following characteristics:

| | |
|---|---|
| Wiley Melting point | 115° F. |
| Iodine Value | 58 |
| Alpha Monoglyceride Content | 0.9% |
| Temperature ° F. | SFI |
| 50° | 35 |
| 70° | 28 |
| 80° | 26 |
| 92° | 20 |
| 100° | 15 |
| 110° | 8 |

The shortening is tested as formed without tempering as in Example 2 and baked goods are prepared as in Example 2 and similar results are obtained.

EXAMPLE 7

74.2 parts of base fat of Example 5; 8.8 parts of "GS$_3$ fraction" of Example 6 of U.S. Pat. No. 2,927,541; 4.4 parts of hydrogenated tallow having a maximum I. V. of 4 and a capillary melting point of 140° to 145° F.; 0.4 parts of monoglyceride from hydrogenated vegetable oil; 10 parts water and 2.2 parts granulated salt are processed as in Example 2.

The shortening has the following characteristics:

| Wiley Melting Point | 115° F. |
|---|---|
| Iodine Value | 58 |
| Alpha Monoglyceride Content | 0.9% |
| Water Content | 9.5% |
| Salt | 2.2% |
| Temperature ° F. | SFI |
| 50° | 35 |
| 70° | 28 |
| 80° | 26 |
| 92° | 19 |
| 100° | 14 |
| 110° | 8 |

The shortening is tested as formed without tempering and baked goods are prepared as in Example 2 and similar results are obtained.

EXAMPLE 8

59.5 parts of soybean oil which as been hydrogenated to an I. V. of 108 is mixed with 28 parts of "GS$_3$ fraction" of Example 6 of U.S. Pat. No. 2,972,541 and 7 parts non-random, non-lauric glyceride having a W. M. P. of 110° F. and an I. V. of 58; an transoleic content of 42% having a composition within the geometric figure in the drawing of U.S. Pat. No. 2,972,431; 5 parts of hydrogenated cottonseed oil having a maximum I. V. of 15 and a capillary melting point of 140° F. and 0.5 parts of mono- and diglycerides from hydrogenated vegetable oil having a monoglyceride content of at least 40%; an I. V. of 70 to 80 and a capillary melting point of 110° to 120° F. The shortening is processed as in Example 2.

The shortening has the following characteristics:

| Wiley Melting Point | 114° F. |
|---|---|
| Iodine Value | 81 |
| Alpha Monoglyceride Content | 1.6% |
| Temperature °F. | SFI |
| 50° | 33 |
| 70° | 30 |
| 80° | 29 |
| 92° | 22 |
| 100° | 16 |
| 110° | 9 |

The shortening is tested as formed without tempering and baked goods are prepared as in Example 2 and similar results are obtained.

Having thus described the invention, what is claimed is:

1. The process for forming a shortening composition which is functional in pastry preparation when blended into dough in the temperature range between about 50° to 90° F., said shortening being untempered and made from liquefied shortening mixture selected from vegetable fat, or vegetable and animal fats, and from 0 to 15 parts of water per 100 parts of said liquefied mixture, said shortening composition having beta-prime crystalline stability, a Wiley Melting Point in the range of 110° to 120° F., and an SFI profile within the following range:

| Temperature, °F. | SFI |
|---|---|
| 50 | 28 to 40 |
| 70 | 24 to 37 |
| 80 | 22 to 34 |
| 92 | 16 to 28 |
| 100 | 13 to 22 |
| 110 | 5 to 16 | said process comprising the steps of:
a. holding said liquefied shortening mixture at a temperature high enough to maintain said mixture completely liquid;
b. feeding said liquid shortening mixture to one end of an elongated scraped wall heat exchange zone wherein said completely liquid shortening is rapidly chilled with vigorous agitation in about 15 seconds to about two minutes to a temperature $T_1$ in the range of about 62° to 80° F. to develop a beta-prime nucleated shortening mixture;
c. passing the nucleated shortening mixture resulting in step (b) directly to a kneading and heat exchange zone at a temperature $T_2$ in the range of about 75° to 60° F., wherein said nucleated mixture is kneaded and cooled for a time sufficient to further develop beta-prime crystalline phase with concommittant thickening while maintaining an extrudable plastic shortening mass;
d. extruding the resulting extrudable plastic shortening mass at a temperature in the range of about 62° to 77° F. directly into user packages as finished shortening.

2. The process of claim 1 wherein said shortening is compounded substantially entirely from vegetable fats.

3. The process of claim 1 wherein said shortening further includes water in a proportion of about 1 part to about 10 parts per 100 parts of shortening.

4. The process of claim 1 wherein the temperature $T_1$ is in the range of about 65° to 72° F., and the temperature $T_2$ is in the range of about 68° to 60° F.

5. The process of claim 1 wherein said shortening is compounded from the following proportions of beta-prime-tending glyceride base stocks:

| Base Stock | Iodine Value | Wiley Melting Point | Weight Percent of Shortening Composition |
|---|---|---|---|
| Soft Stock | 50 to 100 | 110 to 70 | 60 to 96 |
| Intermediate Stock | 35 to 49 | 125 to 111 | 0 to 35 |
| Hard Stock | 0 to 20 | 150 to 126 | 2 to 10. |

* * * * *